Jan. 28, 1936. O. K. EKRE 2,029,225
INSECT DESTROYER
Filed March 7, 1935 5 Sheets-Sheet 3
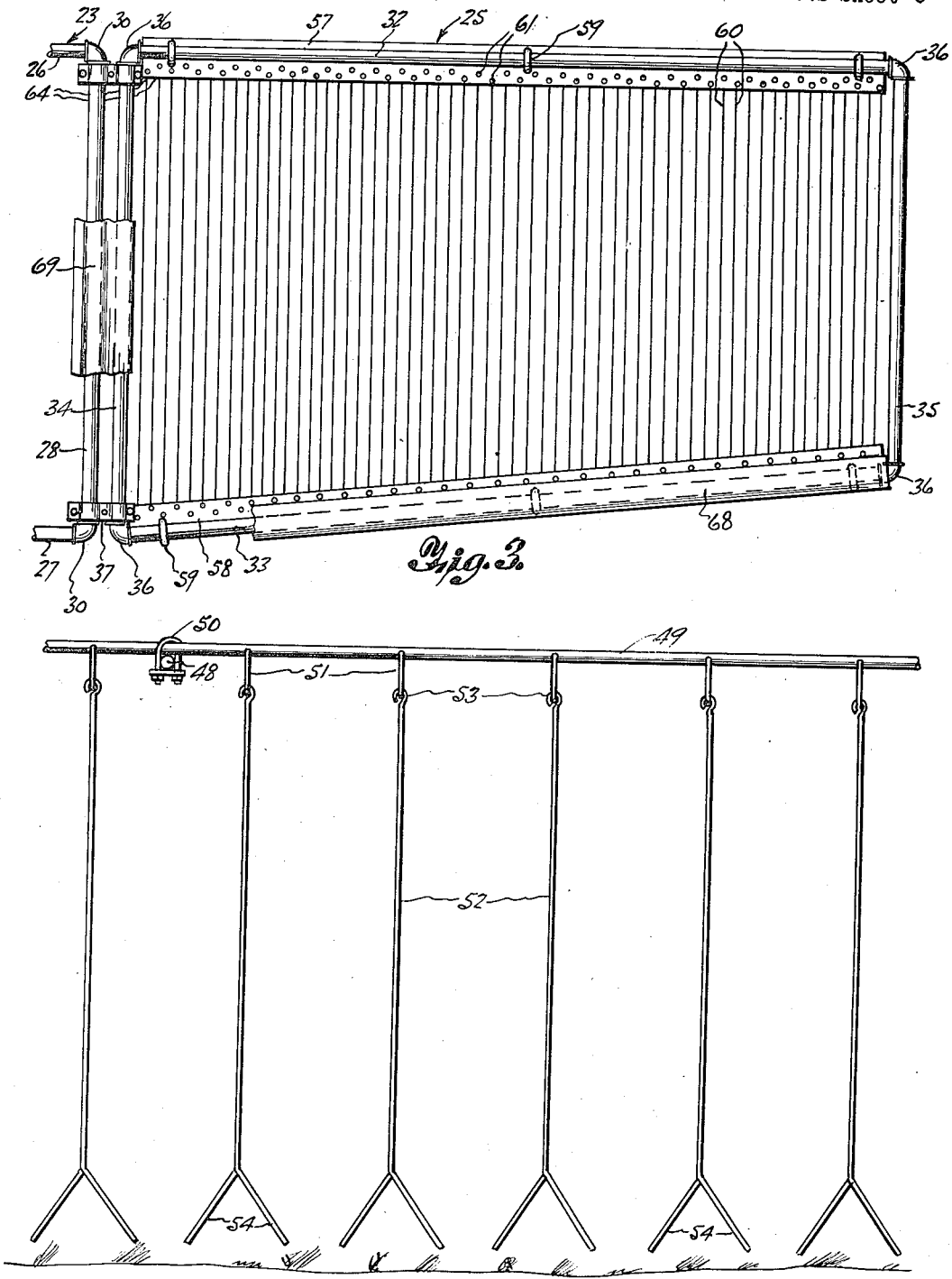

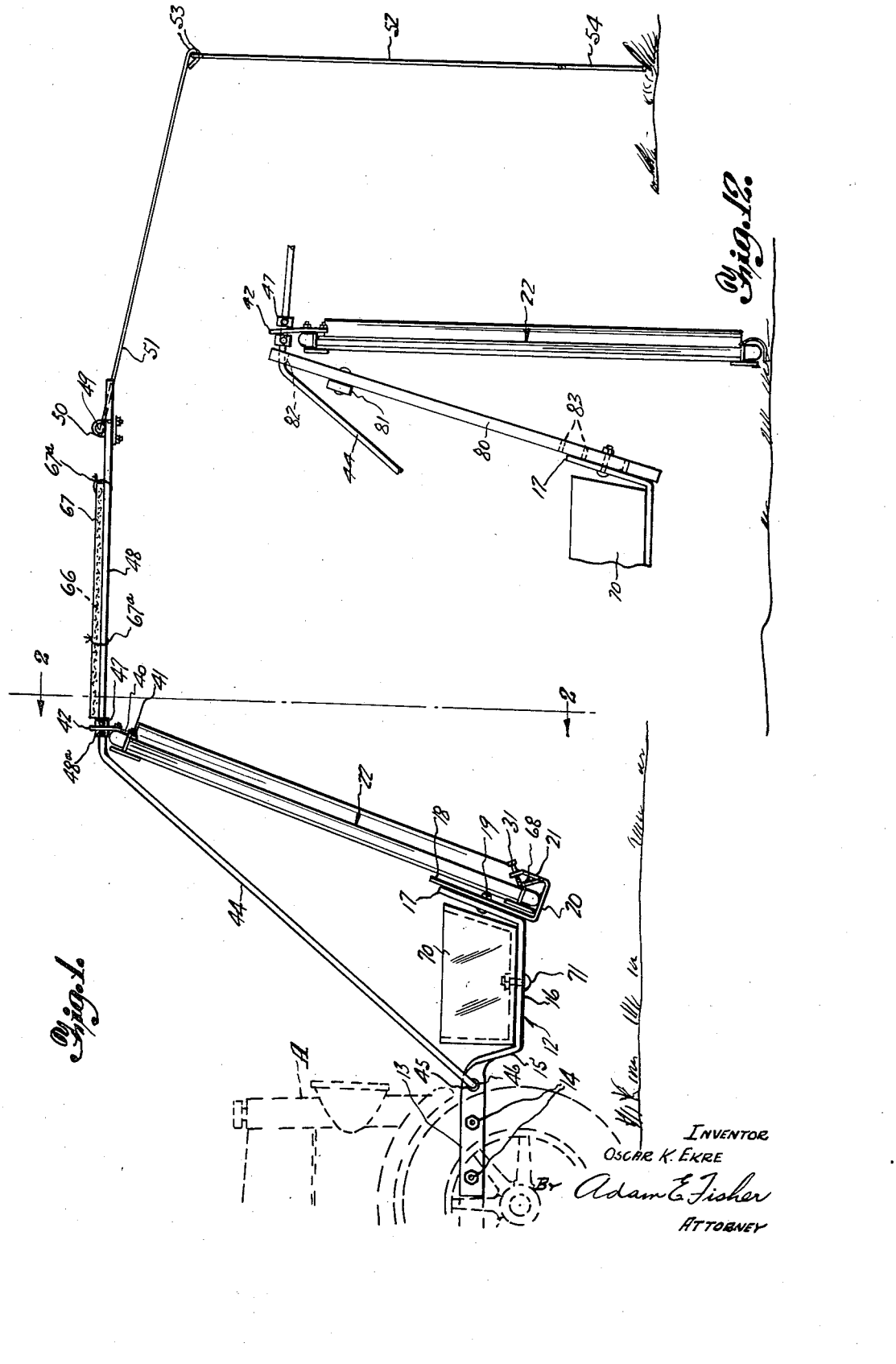

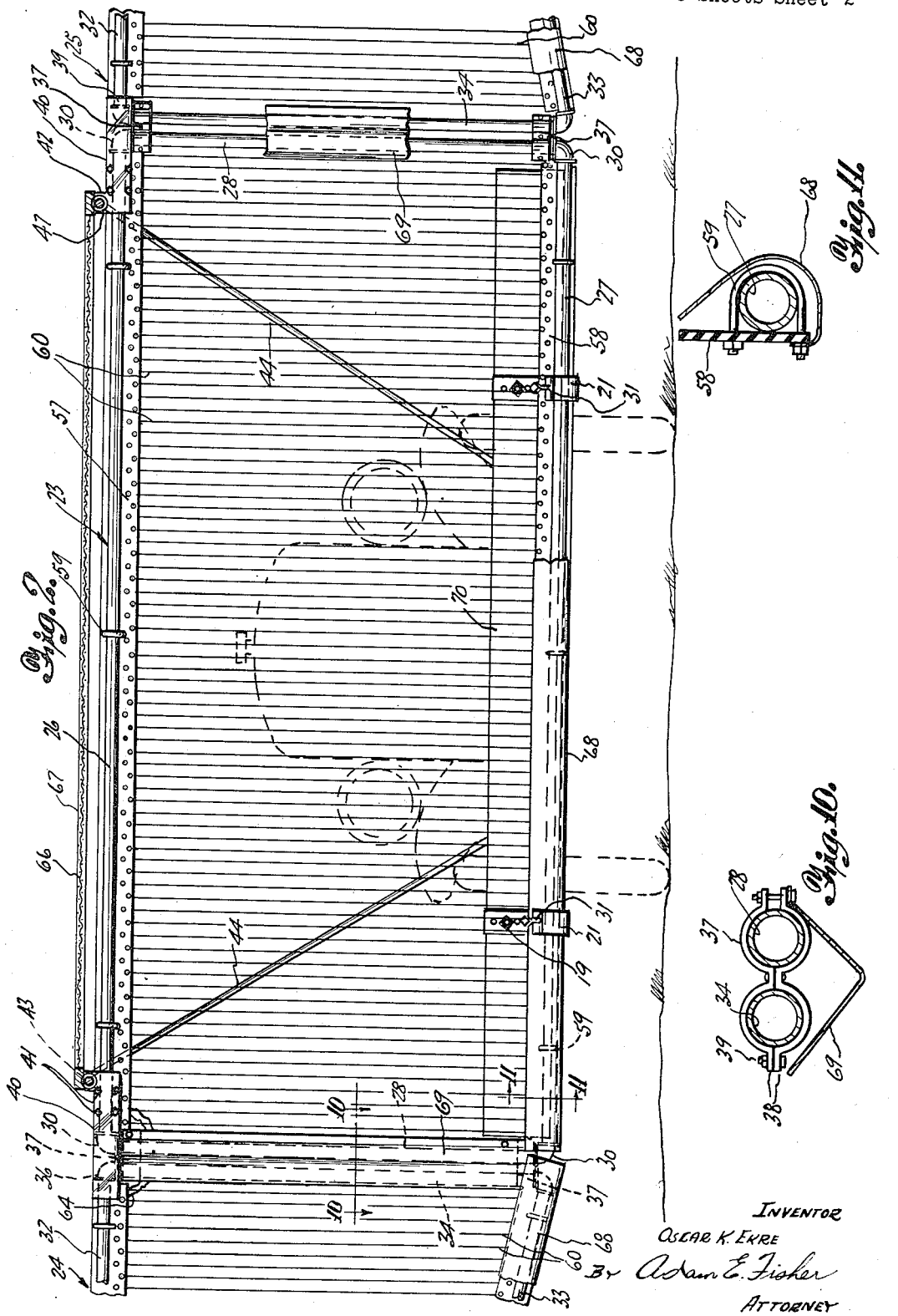

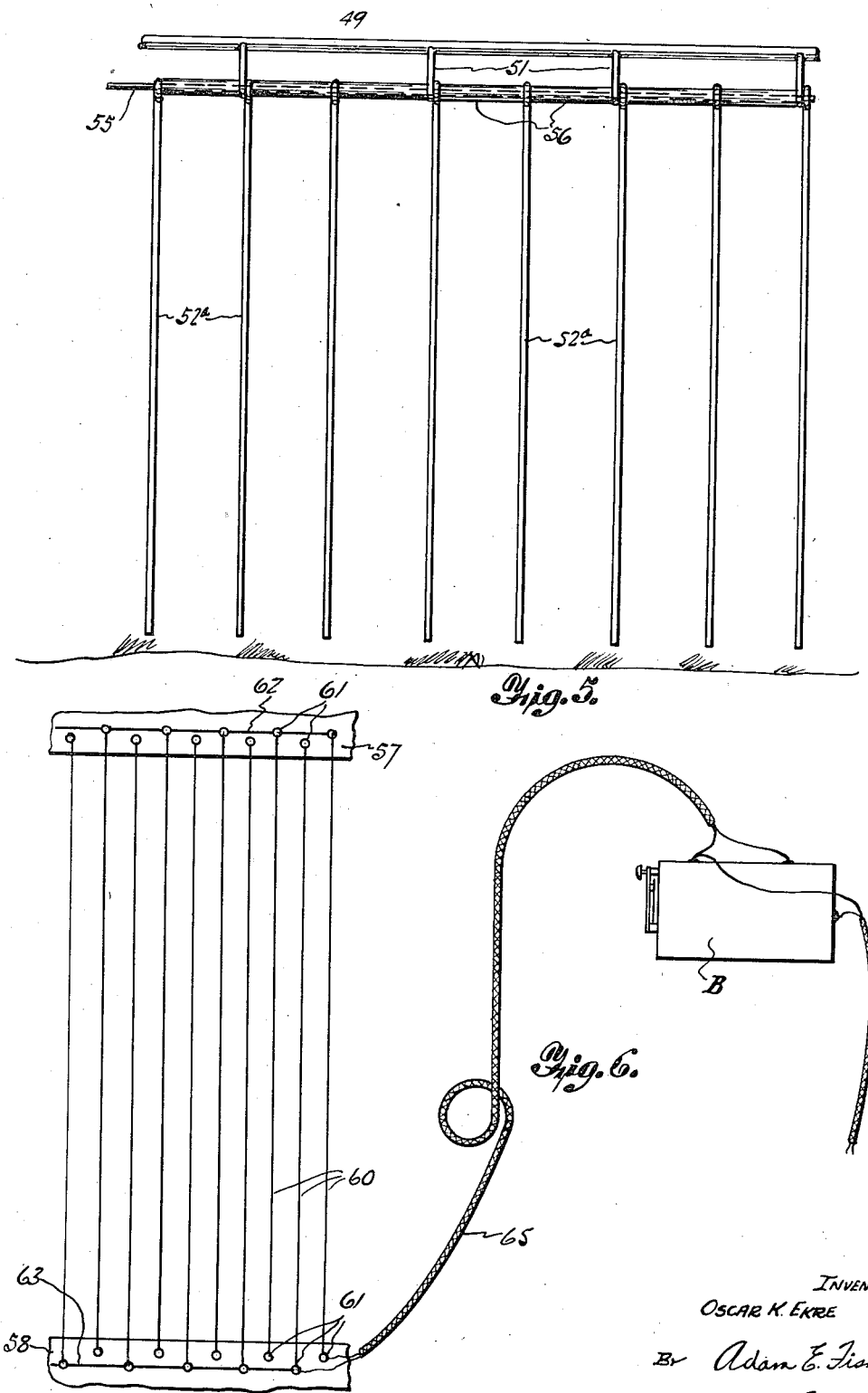

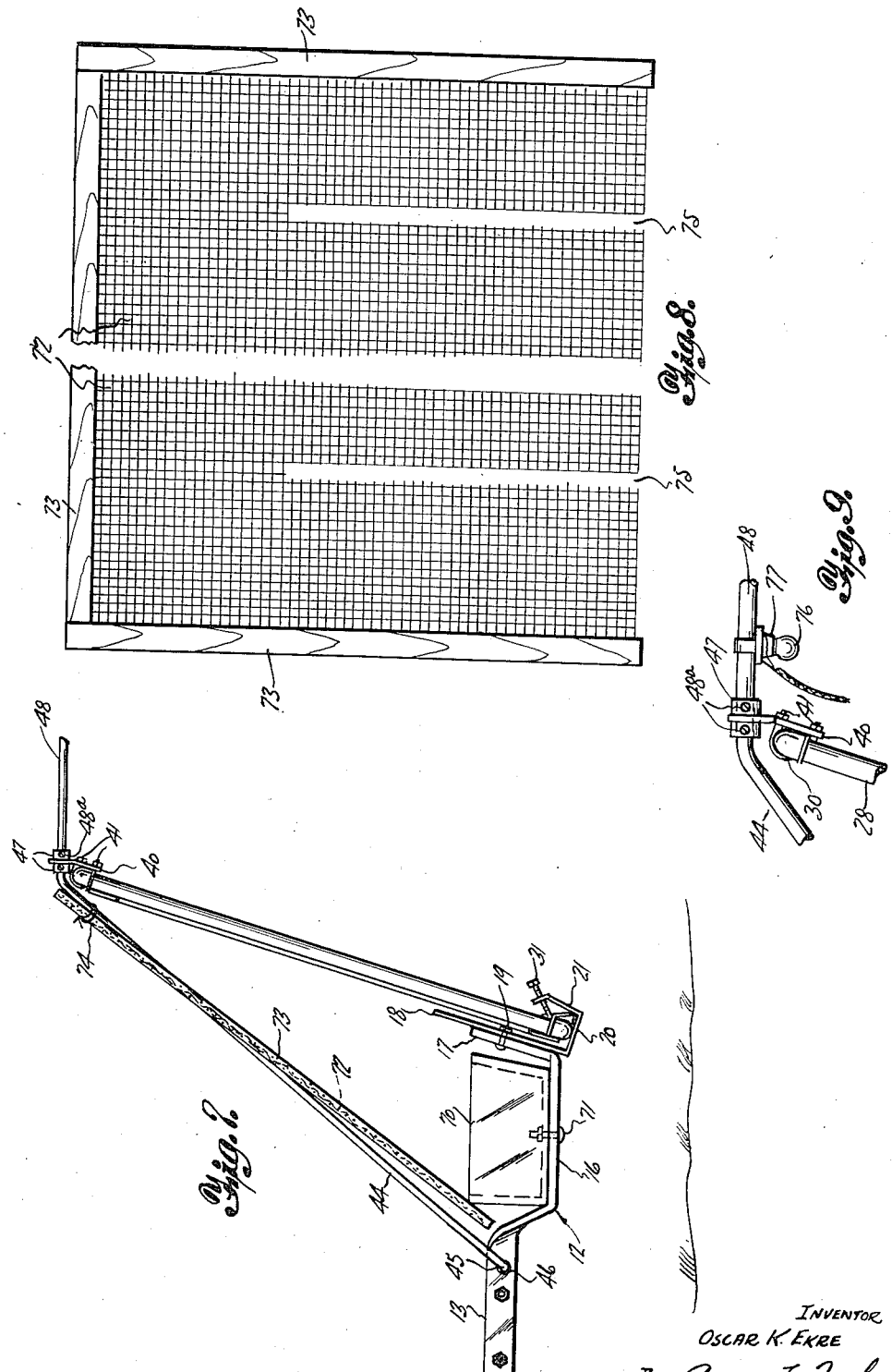

Patented Jan. 28, 1936

2,029,225

UNITED STATES PATENT OFFICE 2,029,225

INSECT DESTROYER

Oscar K. Ekre, Forks, Mont.

Application March 7, 1935, Serial No. 9,732

8 Claims. (Cl. 43—138)

My invention relates to improvements in insect destroyers and harvesters and the main object is to provide a device or machine by which grasshoppers and other injurious insects which infest the farmers' fields and crops may be killed in large quantities and, if desired, collected for use as feed or fertilizer.

Another object is to provide a device of this kind which may be readily mounted on an automobile or truck to be carried thereby over the fields and which includes as its main and essential elements a forwardly disposed agitator assembly designed to flush up the insects from the field ahead of the machine, a following forwardly and upwardly inclined articulated frame extended crosswise to the line of travel and carrying spaced electrically charged wires against which the insects as they arise will come in contact and by which they will be killed. Immediately behind this frame a collecting box may be carried into which the dead insects will fall if it is desired to save or harvest them for any reason.

Another object is to provide a device of this kind in a simple, and inexpensive form well suited to its work and which may be readily adapted for use either for killing grasshoppers and like insects or for use at night in killing millers and other night flying insects.

With these and other objects in view the invention resides in the novel construction and arrangement of parts as hereinafter fully set forth and claimed, reference being had to the accompanying drawings wherein:

Figure 1 is a side view of the device as attached to an automobile shown in dotted lines.

Figure 2 is a sectional view along the line 2—2 in Figure 1, the end sections of the frame being broken away.

Figure 3 is a frontal elevation of one end section or panel of the frame.

Figure 4 is a frontal elevation of one end portion of the agitator assembly.

Figure 5 is a view similar to Figure 4 but showing a modified form of the agitator wires or fingers.

Figure 6 is an enlarged fragmentary detail view of the electrocuting wire assembly and diagrammatic view of the wiring and energizing system therefor.

Figure 7 is a fragmentary side elevation showing a rear enclosure screen in place over the harvesting box.

Figure 8 is an elevation of the rear enclosure screen with a central portion broken out.

Figure 9 is an enlarged fragmentary detail view showing the installation of lights on the device when used at night for killing millers, etc.

Figure 10 is an enlarged horizontal cross section along the line 10—10 in Figure 2.

Figure 11 is an enlarged vertical cross section along the line 11—11 in Figure 2.

Figure 12 is a fragmental side elevation showing a means for lowering the frame to gather and kill small or young insects.

Referring now with more particularity to the drawings in carrying out my invention I provide two heavy mounting brackets or arms 12 including flat tangs or ends 13 pierced with spaced holes to receive bolts 14 by which they may be mounted in any suitable and convenient place on the front of an automobile or truck A of conventional form. From these rigidly mounted tangs 13 the brackets extend and preferably diverge forwardly to a distance of about six feet apart, are twisted axially through an arc of 90 degrees to present their flat sides uppermost and are bent downward at 15 and then forwardly and finally upwardly at their front ends forming a horizontal box seat 16 and upwardly and forwardly inclined mounting ends 17. Hangers 18 of L-shaped form are secured by bolts 19 through one leg to these ends 17 and the feet 20 of these hangers extend forwardly and are turned upwardly a short distance at 21. Provision for vertical adjustment of these hangers 18 may be made by a series of holes in the legs through which the bolts 19 pass as shown.

Mounted in these hangers 18 is an elongated frame designated generally at 22 comprising three main sections, the center section 23 and the two end sections or panels 24 and 25. Said center section 23 is of rectangular form made up preferably out of conventional pipe and couplings comprising the upper and lower pipes 26 and 27, end pipes 28 and connecting elbows 30 at the ends of these pipes. This frame is seated in the hangers 18 down against the feet 20 thereof and is held in place by set screws 31 turned down through the ends 21 of said hangers against the lower pipe 27. The end sections or panels 24 and 25 are each similarly formed of upper and lower pipes 32 and 33 and inner and outer end pipes 34 and 35 joined at the corners by elbows 36 and these end panels are hinged at their inner ends to the outer ends of the center section 23 by any suitable form of hinges 37 which as shown comprise separable straps 38 encircling the adjacent end pipes 28 and 34 are releasably connected by bolts 39 which allow the removal of the end sections when desired.

At the upper corners of the center section 23 stop plates 40 are provided and are secured on the upper pipe 26 parallel therewith by U-bolts 41 and extend at their free ends outwardly in front of the inner upper corners of the end panels 24 and 25 some distance as shown. Upward extensions or ears 42 on these plates 40 are apertured at 43 to receive brace rods 44 which are hooked at 45 at one end in the apertures 46 in the tangs 13 of the brackets 12 and extend upwardly and forwardly through the said ears 42. Collars 47 having set screws 48a are secured on the brace rods 44 before and behind the ears 42 and serve to hold the upper edge of the frame 22 against play and in such position that the frame inclines forwardly and upwardly from the vertical somewhat as evident in Figure 1. This angular position of the frame 22 has a two-fold purpose, first, of presenting the frame in best position for obstructing the flight of the insects as will be pointed out and, second, so that the end panels 24 and 25 may swing back should they strike any obstruction and then, through force of gravity, will return to their normal positions aligned with the center section 23. In fact, these end panels 24 and 25 would normally swing forward beyond the plane of the center section but they are prevented from doing so by contact with the stop plates 40. The end panels 24 and 25 preferably taper toward their outer ends so as to clear the ground in any position. This articulation of the frame 22 allows it to be of relatively great length and to sweep a wider swath through the field with resulting reduction in time and labor required to cover the field. Stop plates (not shown) similar to the stop plates 40 may also be placed at the lower side of the frame if desired. The brace rods 44 extend horizontally through the ears 42 some distance forwardly of the frame 22 as indicated at 48 and an elongated cross rod 49 is secured on the ends of the brace rods by U-bolts or clevises 50. At spaced points support rods 51 are secured to the cross rod 49 and extend forwardly therefrom and to the forward ends of these rods 51 agitator fingers or rods 52 are loosely pivoted by the interconnected eyes 53 at the adjacent ends of the rods. At their lower ends the fingers 52 are forked as shown at 54. These elements constitute the agitator assembly and as the machine travels over the field the forked ends 54 of the fingers 52 stir or flush up the insects from the ground as will be readily evident. The height of the fingers 52 off the ground may be varied by rotating the cross rod 49 in the U-bolts 50 and also the distance of the fingers forwardly of the frame 22 may be varied by sliding the rod 49 forwardly or rearwardly on the ends 48 of the brace rods 44.

In lieu of the forked type of agitator fingers 52 the frontal ends of the support rods 51 may be joined by a rod 55 (Figure 5) and twice as many straight and un-forked fingers 52a hung from this rod 55 and spaced by sleeves 56 as shown if so desired.

Elongated upper and lower terminal strips 57 and 58 of insulating material such as fiber, bakelite or impregnated wood are secured along the upper and lower margins of the frame 22 by means of U-bolts 59 or other suitable devices encircling the upper and lower pipes 26, 32 and 27, 33 of the center and end sections of the frame, these strips being of course, in pieces equal to the width of these frame sections as clearly shown. The strips 57 and 58 extend inward or toward each other clear of the frame preferably on the rear side thereof and a wire screen or grid is strung between these strips. Said screen is made up of vertically extended and parallel wires 60 strung taut between the strips and secured thereto at their ends by screw terminals or posts 61. Alternate wires all along the frame are connected at the top by a common bus 62 and the intervening alternate wires are similarly connected at the bottom by a bus 63, these busses on the center frame section 23 being connected to those on the end sections 24 and 25 by flexible connections 64. The wires 60 thus are arranged in interdigitating relationship and any adjacent pair of wires forms the two sides of an electrical circuit insulated from each other and from the frame. A two wire cable 65 leads from any suitable point of the busses 62 and 63 to a high tension coil B of conventional form which has its input wires C arranged for connection to the auto storage battery (not shown). Any other practical source of high tension electricity might be used as well.

Now as the machine is carried over the field by the auto A the agitator fingers 52 (or 52a) will flush up the insects and as they arise and fly upward the forward motion of the machine will cause them to strike the frame 22 and the wires 60 therein. These wires being properly spaced, the insects will bridge the wires as they strike and the high tension existing between each pair of wires will pass through and electrocute the insects. In order to prevent the insects from flying up ahead of the frame 22 a wire screen 66 in a frame 67 may be laid across the ends 48 of the brace rods 44 just forwardly of the upper edge of the frame and secured thereto by cord or wire 67a as shown. Also, bottom deflector plates 68 may be secured by the U-bolts 59 (or other means) to the bottom pipes 27 and 33 of the frame sections 23, 24 and 25 and curved upwardly and rearwardly back over these pipes to deflect the insects onto the wires 60. In similar manner hinge cover plates or deflector plates 69 may be secured to the hinges 37 or other suitable parts and formed into V-shaped cross section covering the frontal sides of the end pipes 28 and 34 to deflect the insects onto the wires 60 at each side.

In some cases it may be desirable to collect and save the dead insects for poultry feed, fertilizer or the like, and for this purpose a long rectangular box 70 is secured by bolts 71 on the box seat portion 16 of the brackets 12 immediately behind the frame 22. Then as the insects pass through and between the wires 60 (which a great many will do) they will fall into this box 70. A rectangular back screen 72 having side and end bars 73 is leaned up against the brace rods 44 and attached thereto at its upper end by a cord or wire 74. At its lower end the screen 72 is forced down against the rear edge of the box 70 and the insects passing through the frame 22 will thus be deflected down into the box. If necessary, the lower margin of the screen 72 may be slit at spaced points at 75 to clear the brace rods 44 when it is forced down against the box as described. The end sections 24 and 25 of the frame 22 may be removed when harvesting the insects since it would be impractical to make the box 70 long enough to extend out behind these end sections, and if so made, the box would interfere with the swinging movement of the end sections described hereinbefore.

For killing millers and other night flying insects electric lamps or bulbs 76 may be placed in sockets 77 secured on the brace rods 44 just forwardly of the frame 22 or at other suitable points and these lamps being lighted from the auto battery the illumination will attract the insects and they will be killed by coming in contact with the wires 60. The agitator assembly may be dispensed with for night use if desired.

In order to gather and kill young insects and particularly in young or short vegetation the hangers 18 may be removed and wooden bars 80 substituted as shown in Figure 12. These bars are connected near their upper ends by a cross brace 81 and have notches 82 in their upper ends to receive the brace rods 44. The lower margins of the frame thus hang free near the ground as shown and are in position to kill young and small insects and the like. Holes 83 in the bottom of the bars 80 permit vertical adjustment of the frame to suit conditions and allow it to even be dragged along the ground if desired.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In a device of the kind described, brackets adapted for mounting on a vehicle, an elongated rectangular open frame adjustably supported by the brackets crosswise to the line of travel of the vehicle, the said frame being inclined forwardly and upwardly, electrically charged wires strung in spaced parallel relation in the frame and insulated therefrom, an agitator assembly supported forwardly of the frame, open rectangular end panels hinged to the ends of the frame, and electrically charged wires strung in these end panels and connected to the wires in the frame.

2. In a device of the kind described, brackets adapted for mounting on a vehicle, an elongated rectangular open frame adjustably supported by the brackets crosswise to the line of travel of the vehicle, the said frame being inclined forwardly and upwardly, electrically charged wires strung in spaced parallel relation in the frame and insulated therefrom, an agitator assembly supported forwardly of the frame, open rectangular end panels hinged to the end of the frame, electrically charged wires strung in these end panels and connected to the wires in the frame, the said agitator assembly comprising rods extended forwardly from the upper edge of the frame, a cross rod adjustably mounted on these rods parallel with the frame and some distance forwardly thereof, support rods secured to the cross rod and extended forwardly therefrom, and agitator fingers depended freely from the frontal ends of the support rods.

3. In a device of the kind described, brackets adapted for mounting on a vehicle and extending forwardly therefrom, hangers adjustably mounted on the brackets, a frame comprising rectangular open center and end sections, the latter hinged at the ends of the frame, the said center section being rigidly mounted in an upwardly and forwardly inclined position in the hangers, stops extended from the ends of the center section across the frontal sides of the end sections, insulating strips mounted along the upper and lower margins of the frame sections, electrically charged wires strung in spaced parallel relation between the strips, brace rods extending from the brackets up over and forwardly beyond the upper edge of the center frame section and secured thereto, a cross rod adjustably mounted across the frontal ends of the brace rods, support rods extended forwardly from the cross rod, and agitator fingers depended freely from the frontal ends of the support rods.

4. In a device of the kind described, brackets adapted for mounting on a vehicle and extending forwardly therefrom, hangers adjustably mounted on the brackets, a frame comprising rectangular open center and end sections, the latter hinged at the ends of the frame, the said center section being rigidly mounted in an upwardly and forwardly inclined position in the hangers, stops extended from the ends of the center section across the frontal sides of the end sections, insulating strips mounted along the upper and lower margins of the frame sections, electrically charged wires strung in spaced parallel relation between the strips, brace rods extending from the brackets up over and forwardly beyond the upper edge of the center frame section and secured thereto, a cross rod adjustably mounted across the frontal ends of the brace rods, support rods extended forwardly from the cross rod, agitator fingers depended freely from the frontal ends of the support rods, and an elongated open-topped box mounted behind the center section of the frame on the said brackets.

5. In a device of the kind described, brackets adapted for mounting on a vehicle and extending forwardly therefrom, hangers adjustably mounted on the brackets, a frame comprising rectangular open center and end sections, the latter hinged at the ends of the frame, the said center section being rigidly mounted in an upwardly and forwardly inclined position in the hangers, stops extended from the ends of the center section across the frontal sides of the end sections, insulating strips mounted along the upper and lower margins of the frame sections, electrically charged wires strung in spaced parallel relation between the strips, brace rods extending from the brackets up over and forwardly beyond the upper edge of the center frame section and secured thereto, a cross rod adjustably mounted across the frontal ends of the brace rods, support rods extended forwardly from the cross rod, agitator fingers depended freely from the frontal ends of the support rods, an elongated open-topped box mounted behind the center section of the frame on the said brackets, and rectangular screens mounted over the brace rods forwardly and behind the frame center section.

6. In a device of the kind described, an electrically charged screen, means for mounting the screen transversely at the front of a vehicle, and a plurality of agitator fingers extended over forwardly of the screen and depended with their extremities adjacent the ground in advance of the vehicle.

7. In a device of the kind described, an electrical screen, means for supporting the screen transversely at the front of a vehicle, auxiliary electrical screens hinged laterally of the first mentioned screen, a cover screen arranged horizontally over the electrical screens immediately in advance thereof, and a plurality of agitator fingers extended forwardly of the said screens and having their extremities depended vertically adjacent the ground.

8. In a device of the kind described, a screen adapted to be charged with electricity for the purpose of killing insects contacting same, means for supporting the screen vertically transversely at the front of a vehicle, a cover screen supported horizontally above and immediately in advance of the electrical screen, and a plurality of agitator fingers pivotally supported forwardly of the said screens with their extremities depended vertically adjacent the ground.

OSCAR K. EKRE.